US008103564B2

(12) United States Patent
Foote

(10) Patent No.: US 8,103,564 B2
(45) Date of Patent: Jan. 24, 2012

(54) METHOD OF PROCESSING INVESTMENT DATA AND MAKING COMPENSATION DETERMINATIONS AND ASSOCIATED SYSTEM

(75) Inventor: Brian Edward Foote, Imperial, PA (US)

(73) Assignee: Access Data Corporation a Broadridge Company, Pittsburgh, PA (US)

( * ) Notice: Subject to any disclaimer, the term of this patent is extended or adjusted under 35 U.S.C. 154(b) by 1074 days.

(21) Appl. No.: 11/027,084

(22) Filed: Dec. 30, 2004

(65) Prior Publication Data

US 2006/0149646 A1 Jul. 6, 2006

(51) Int. Cl.
*G06Q 40/00* (2006.01)
(52) U.S. Cl. ............... 705/35; 705/30; 705/39; 705/40
(58) Field of Classification Search .............. 705/37, 705/35
See application file for complete search history.

(56) References Cited

U.S. PATENT DOCUMENTS

| | | | |
|---|---|---|---|
| 5,214,579 A | 5/1993 | Wolfberg et al. | |
| 5,583,760 A | 12/1996 | Klesse | |
| 5,749,077 A | 5/1998 | Campbell | |
| 5,864,685 A | 1/1999 | Hagan | |
| 5,893,079 A | 4/1999 | Cwenar | |
| 6,055,525 A | 4/2000 | Nusbickel | |
| 6,185,567 B1 | 2/2001 | Ratnaraj et al. | |
| 6,470,325 B1 * | 10/2002 | Leemhuis | 705/36 R |
| 6,604,104 B1 | 8/2003 | Smith | |
| 6,947,904 B1 | 9/2005 | Macey | |
| 7,149,713 B2 | 12/2006 | Bove et al. | |
| 7,165,044 B1 | 1/2007 | Chaffee | |
| 7,184,984 B2 | 2/2007 | Glodjo et al. | |
| 7,197,484 B1 | 3/2007 | Yuyama | |
| 7,321,871 B2 | 1/2008 | Scott et al. | |
| 2001/0014873 A1 | 8/2001 | Henderson et al. | |
| 2002/0002512 A1 | 1/2002 | Harpale | |
| 2002/0032636 A1 * | 3/2002 | Shields et al. | 705/37 |
| 2002/0069155 A1 | 6/2002 | Nafeh et al. | |
| 2002/0112055 A1 | 8/2002 | Capers et al. | |
| 2002/0133458 A1 | 9/2002 | Zhou et al. | |
| 2002/0138386 A1 | 9/2002 | Maggioncalda et al. | |
| 2002/0143680 A1 | 10/2002 | Walters et al. | |
| 2003/0040999 A1 | 2/2003 | Hagan | |
| 2003/0070003 A1 | 4/2003 | Chong et al. | |
| 2003/0093352 A1 | 5/2003 | Muralidhar et al. | |
| 2003/0167221 A1 | 9/2003 | Kochansky | |
| 2003/0208378 A1 | 11/2003 | Thangaraj et al. | |
| 2003/0208559 A1 | 11/2003 | Velline et al. | |
| 2003/0225663 A1 | 12/2003 | Horan et al. | |
| 2004/0039646 A1 | 2/2004 | Hacker | |
| 2004/0088195 A1 | 5/2004 | Childress et al. | |
| 2004/0162772 A1 | 8/2004 | Lewis | |
| 2004/0167840 A1 | 8/2004 | Tully et al. | |
| 2004/0167849 A1 | 8/2004 | Yass et al. | |
| 2004/0210501 A1 | 10/2004 | Laskin et al. | |
| 2004/0215549 A1 | 10/2004 | Madhavan et al. | |

(Continued)

*Primary Examiner* — Lindsay M Maguire
*Assistant Examiner* — James Vezeris
(74) *Attorney, Agent, or Firm* — Greenberg Traurig, LLP

(57) ABSTRACT

A computerized method for processing investment data includes providing a server supporting a database for receiving, processing and storing investment data which includes compensation data; providing a compensation rules engine for processing compensation data employing rules relating to compensation; introducing into the server investment data from a plurality of external sources, processing the compensation data by the compensation rules engine and permitting user access to the processed and stored investment data. Information regarding sales units, customer investments, client information and investment transaction information is provided in the server. A corresponding system is disclosed.

24 Claims, 4 Drawing Sheets

U.S. PATENT DOCUMENTS

| | | |
|---|---|---|
| 2005/0007249 A1 | 1/2005 | Eryurek et al. |
| 2005/0060205 A1 | 3/2005 | Woods et al. |
| 2005/0102219 A1* | 5/2005 | Taylor et al. .................... 705/37 |
| 2005/0137969 A1 | 6/2005 | Shah |
| 2005/0182655 A1 | 8/2005 | Merzlak et al. |
| 2006/0064371 A1 | 3/2006 | Petrov |
| 2006/0080222 A1* | 4/2006 | Lutnick et al. ................. 705/37 |
| 2006/0145892 A1 | 7/2006 | Gueziec |
| 2007/0130043 A1 | 6/2007 | O'Shaughnessy et al. |
| 2007/0174160 A1 | 7/2007 | Solberg et al. |
| 2007/0179890 A1 | 8/2007 | Sandford et al. |
| 2007/0192336 A1 | 8/2007 | Iyer et al. |
| 2007/0226027 A1 | 9/2007 | Chang et al. |

* cited by examiner

METHOD OF PROCESSING INVESTMENT DATA AND MAKING COMPENSATION DETERMINATIONS AND ASSOCIATED SYSTEM

BACKGROUND OF THE INVENTION

1. Field of the Invention

The present invention relates to an improved method and associated computerized system for providing efficient processing of investment data including transactional data and investment holdings and more specifically, it relates to such a method and a related system which will facilitate determination of compensation due sales units and will employ detailed information regarding investment transactions, investment holdings, customers, clients and sales unit agents and representatives.

2. Description of the Prior Art

It has long been known to employ computers to receive data, process the same within a computer and store the same for retrieval from a database.

In the field of investments, the very high volume of investment transactions and wide range of determinations that need to be made and records provided have led to the recognition that a computerized system for receipt, processing, storing and outputting various types of investment data in various formats would be advantageous. See, for example, U.S. Pat. Nos. 5,749,077 and 5,893,079.

One of the problems that exists in connection with the processing of large volumes of investment transactions and holdings is the monitoring of customer activities and assets and accurate computation of the various segments of the investment community interacting on behalf of a given customer directly or indirectly in a given transaction thereby making the computation of the financial credit or compensation due difficult. This is particularly true when one takes into account the large variety of sales units involved in various investment transactions and investment or asset holding activities in addition to the individual obligations to sales units which are directly or indirectly involved.

There remains, therefore, a real and substantial need for an effective automated system which can accurately and rapidly process large volumes of investment data received from multiple external sources and apply rules to the same so as to permit precise determination of compensation due sales units resulting therefrom.

SUMMARY OF THE INVENTION

The present invention has met the hereinbefore described need.

In a preferred method of the present invention, a server which supports a database is structured to receive, process and store investment data and to make determinations regarding compensation and provide output, such as reports regarding the same. For simplicity of disclosure herein, the term "server" will be employed to refer to and include a database and/or compensation rules engine supported by the server including one or more operatively associated servers and regardless of whether the database or compensation rules engine is physically a portion of the server or is operatively associated therewith through suitable interaction.

A compensation rules engine is provided in order to facilitate determination of compensation from investment data by applying compensation rules thereto. Investment data from a plurality of external services is introduced into the server through a suitable interface. User access, preferably through the internet, is permitted so as to respond to user queries and to deliver the information to a plurality of users in predetermined report form or any other desired logical form or other form. The user interface also permits a data steward to provide input to revise information which will be provided on the host server.

A corresponding computerized system is also provided.

It is an object of the present invention to provide a computerized method and associated system for receiving investment data from a plurality of external sources and receiving, processing and storing the same in a desired format.

It is another object of the present invention to provide such a method wherein investment data for making an accurate determination of compensation due one or more sales units resulting from investment transactions or asset valuations can be made rapidly and accurately.

It is another object of the present invention which facilitates application of appropriate compensation rules so as to process investment transactions, monitor asset valuations and make accurate compensation determinations.

It is another object of the present invention to provide such a method and system which employs rules and rule sets which may be hierarchical in effecting compensation determinations.

It is a further object of the present invention to provide such automated systems which facilitate simultaneous introduction of data from external nonuser sources into the system and simultaneous access to the system by a plurality of users as well as a data steward, while storing the investment data in the server in desired locations and format in orders to facilitate ready review and retrieval as well as compensation determinations.

These and other objects of the invention will be more fully understood from the following description of the invention on reference to the illustrations appended hereto.

DESCRIPTION OF THE PREFERRED EMBODIMENTS

Figure 1:
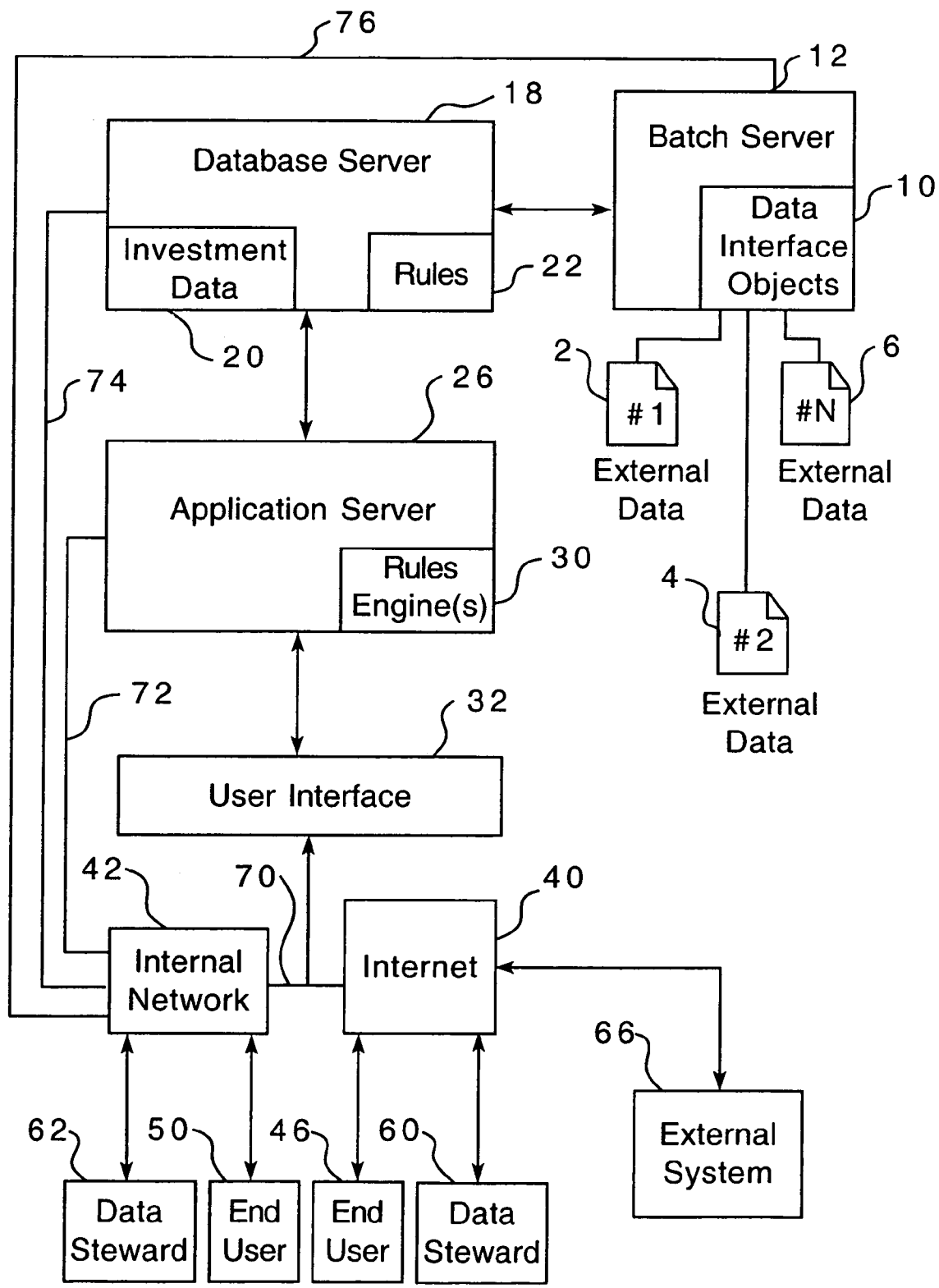
FIG. 1 is a schematic illustration showing a form of system of the present invention structured to facilitate practice of the methods of the present invention.

The present invention may employ portions of the invention disclosed in U.S. Ser. No. 10/944,202 entitled "Method of Processing Investment Data and Associated System" and filed Sep. 17, 2004, the disclosure of which is expressly incorporated herein by reference.

As employed herein, the term "data object" means an interchangeable software logic component usable with other data objects in a data object interface to perform essentially the same function in different ways.

As employed herein, "data interface object" means a functional interface for conversion of external investment data of different formats into a common format with each data object interface including at least two data objects. The data object interface may be composed of a group of data object interfaces.

As employed herein, the terms "investment(s)" or "assets" shall expressly include, but not be limited to, mutual funds, common and preferred shares of stocks, whether listed on an exchange or not, high-yield corporate bonds and high-grade corporate bonds, municipal bonds, United States Treasury bills, notes and bonds, mortgage-related investments and short-term securities such as commercial paper, bankers acceptances and re-purchase agreements.

As employed herein, the term "sales unit" means an individual, partnership, corporation or other organization or legal entity or combination of any of the foregoing which based upon activity involving orders, settled trades or investment holdings is entitled to receive compensation.

As employed herein, the term "investment data" means data dealing with investments or sales units which are involved in investments and shall expressly include, but not be limited to, those occupationally involved as well as their customers and clients and shall expressly include information relating to brokers, dealers, clients, main offices, branch offices, addresses, telephone numbers, identity of individuals as well as titles and responsibilities and similar access and identifying information and other data usable in computing compensation.

As employed herein, the term "compensation determination" means a determination of the sales unit or sales units entitled to compensation for the transaction or investment holding and the amount of such compensation to be paid to the specific sales unit or sales units for a transaction or holding involving investments with the determination being made to include financial, compensation, or statistical purposes and shall expressly include, but not be limited to, compensation for orders, settled trades and investment holdings.

As employed herein, "rules" or "compensation rules" means data sufficient to permit determination of compensation based at least in part on investment data.

As employed herein, "rules engine" or "compensation rules engine" means rules receiving software that uses compensation rules and investment data received from external sources to determine compensation.

As employed herein, the term "rules set" means a group of rules which are employed in making a compensation determination.

As employed herein, "rules hierarchy" means a group of rules which are applied in hierarchical fashion with satisfaction of one of such rules starting with the most important in the hierarchical sequence eliminating the need to apply the other rules in the grouping.

As employed herein, "breakpoint" means a specific standard which may be measured in dollars or percentage of desired goals or other standards or markers which are employed to initiate a transition in compensation.

It will be appreciated that making a compensation determination so as to make sure that accurate decisions and payments are made can involve a complex matrix of individuals, organizations and transactional evaluations. For example, one might from a business entity standpoint determine what individual firm, dealer, branch, satellite branch and representative would be entitled to participate in compensation as a sales unit for a transaction or holding. Also, the state, zip code, specific mutual fund, social code, plan or account may enter into the determination, the particular line of business, sales region or territory, product distribution information, external wholesaler and internal wholesaler factors may also need to be considered.

It will be appreciated that the compensation determination of the present invention can be employed for sales units internal and external to the client organization such as respectively, for example, internal wholesalers and external brokers and brokerage firms.

The status of the transaction as to whether it is an order or a settled trade or if it relates to asset holdings may also be involved. Internal rules which govern such transactions must also be considered.

Referring to FIG. 1, a plurality of external sources 2, 4, 6 of investment data which in the form shown have been given #1, #2 through #N may be a plurality of sources of nonuser financial data provided to the system. A suitable interface 10 which is preferably a data interface object of the type disclosed in U.S. patent application Ser. No. 10/878,763 entitled "A Computerized Method of Processing Investment Data and Associated System", the disclosure of which is incorporated herein be reference, is preferably employed.

The investment data which includes compensation rules data is introduced into batch server 12 which, in turn, is connected to database server 18 to provide investment data 20 to database server 18 in which the compensation rules 22 are stored. Database server 18 is programmed to receive, process and store the investment data 20 in the desired format and location along with the rules 22, both of which are stored for ready retrieval. Database server 18 is operatively associated with application server 26 which contains rules engine 30 which contains software to apply the rules 22 to the investment data 20 and make compensation determinations. It will be appreciated that while a preferred form involving the use of servers 12, 18 and 26 is shown with suitable interoperable relationships, it will be appreciated that two or more of the servers 12, 22, 26 may be combined into one physical unit if desired. Communications with application server 26 are effected through user interface or web server 32.

Referring now to the lower portion of FIG. 1, it will be noted that the system can be entered either through the internet 40 or through the internal network 42. Shown by way of illustrative example are an end user 46 and an end user 50 respectively entering through the internet 40 and the internal network 42. It will be appreciated that while a single end user 46 is shown entering through the internet 40 and a single end user 50 is shown entering through the internal network 42, it is contemplated that a plurality of each category of end user may access the system. Similarly, a data stored 60 is shown as entering the system through internet 40 and a data steward 62 is shown entering the system through the internal network 42. Similarly, an external system 66 may enter an external system which may be an individual or another computer, for example, may enter the system through internet 40.

The system is such that it contemplates simultaneous access of the system through both internet 40 and internal network 42 by a plurality of users and data stewards in each category. Also, a plurality of external systems may enter the system simultaneously. It will be appreciated that the internet 40 communicates with internal network 42 through lead 70. Internal network 42 also has a separate connection to application server 26 through connection 72, a connection to database server 18 through connection 74 and connection with batch server 12 through connection 76. The users such as end user 46 and end user 50 may access the system in order to deliver an inquiry and to receive the desired information regarding compensation with the output of the compensation rules engine 30, which may be disposed within application server 26, in a predetermined form or in another desired manner. For example, the desired information in addition to or in lieu of a predetermined report form could be provided in html, xml, pdf files or in other desired form.

Data stewards such as 60 and 62, for example, also interact with the servers 18, 26 through user interface 32 in order to review server content of servers 18 and 26 and make revisions thereto. The compensation rules 22 in the form shown are resident in the database server 18 as will the investment data 20 which contains data which will be processed by the compensation rules engine 30 employing the compensation rules.

An advantage of the present invention is that users may access the system through the internet 40 or other means such as an internal network 42, subject to whatever desired security access restrictions are imposed.

In addition to the users 46, 50 and stewards 60, 62 accessing the servers 18, 26 through user interface 32, users 46, 50 and data stewards 60, 62, other computer and external systems 66 may access the servers 18, 26 directly through the internet 40 or through a dedicated or leased line or communication circuit (not shown), if desired.

Figure 2:
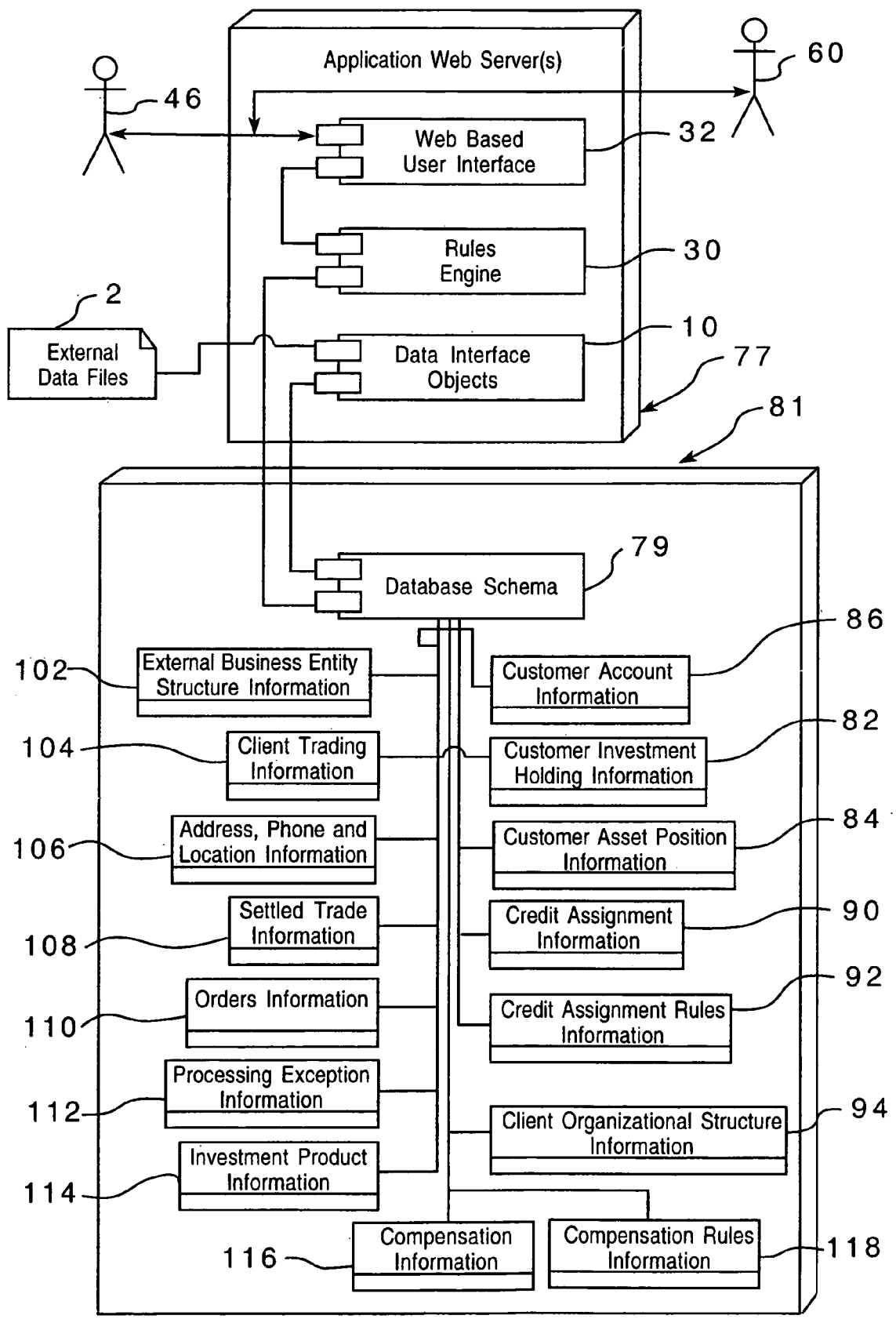
FIG. 2 is an expanded schematic illustration of the system of the present invention which is suitable for use in practicing the method of the present invention.

Referring now to FIG. 2, an expanded schematic view of the method and associated system of the present invention will be considered. In this form for clarity of illustration, the servers 12, 18, 26, 32 shown in FIG. 1, have been identified collectively by reference number 77 and. have been shown as separated from database 81 other than being operatively associated therewith. It will be appreciated that the physical unit may be combined in one housing or be in separate housings which are functionally interconnected. For simplicity of disclosure herein, the server 77 will be regarded as supporting the database and will collectively be referred to as the "server". In a preferred embodiment of the present invention, the server 77 stores investment data 20 and compensation rules 22, may take the form of that disclosed in U.S. patent application Ser. No. 10/944,202.

FIG. 2 shows the server 77 receiving external investment data through external data 2 and compensation rules data 22 through steward 60 and data interface object 10 which in turn outputs the investment data with or without processing to the database server 18 with the internal database receiving the data from data interface objects 10 being identified by the reference number 79. The rules engine 30 has the logic to process the investment data and rules in determining compensation. Also shown in FIG. 2, the user 46 accesses the system through web-based user interface 32, in a bidirectional manner, as does the data steward 60. The data and/or information received through the user interface 32 is delivered to the database 81 for storage in the database schema 79. The rules engine 30 interacts with the database 81 and the database schema 79 to perform desired calculations. The rules engine 30 also interacts with the database 81 and the database schema 79 to store the results of its calculations in 81 and 79. The output of the user interface 32 is received in rules engine 30 to determine compensation and to provide data in the form and content desired. The output of rules engine 30 is delivered to the database 81 for receipt in database module 79.

Also shown within the database 81 are the received investment data, which includes compensation data, which, in turn, contains sales unit information coming from the external nonuser sources 2, and the user 46 and data steward 60. Communications are provided to and from database 79. Shown as being stored for retrieval within the database 79 are customer account information 86, customer investment holding information 82 and customer asset position information 84. Also shown as stored in the desired format and location for ready retrieval are credit assignment information 90, credit assignment rules information 92 and client organizational structure information 94. Compensation information 116 and compensation rules information 118 are also stored. Sales unit information may also be stored. Examples of the sales unit information are the sales unit organizational structure information, the external business entity structure information 102, sales unit trading information 104, address, telephone and location information 106, settled trade information 108 and pending order information 110. Also shown are processing exception information 112 which may, for example, consist of new or updated external business entities, client trading information, investment product information added or updated in the database schema 79 by the data interface objects 10 and investment product information 114.

Figure 3:
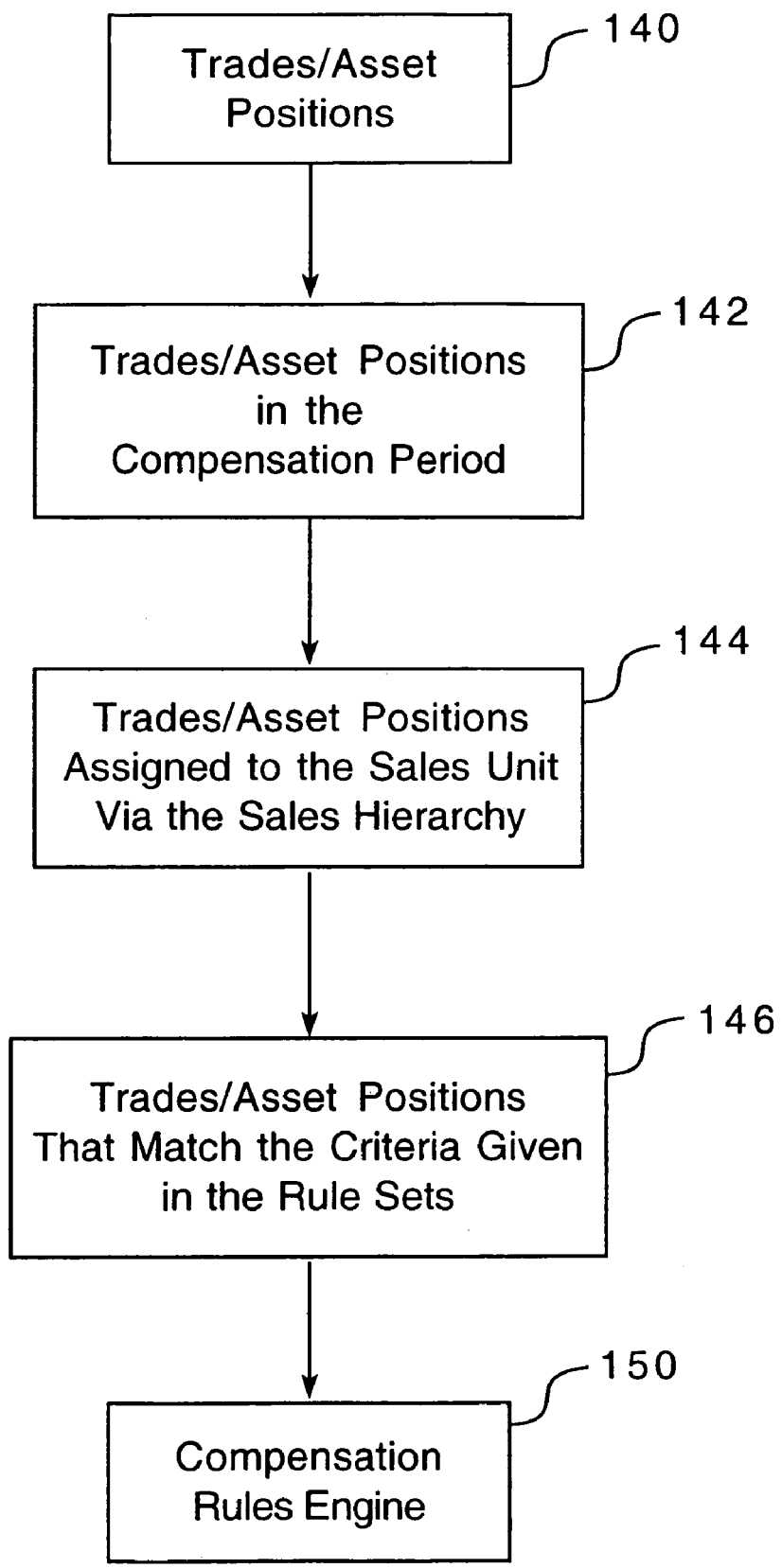
FIG. 3 illustrates is a schematic illustration of a form of method employable in the present invention.

As shown in FIG. 3, information regarding trades and asset position 140 may be obtained from the database servers 12, 18, 26 shown in FIG. 1 with a preferred source being the system and method disclosed in U.S. patent application Ser. No. 10/944,202. This database information 140 is then filtered to create the trade and asset position information for the compensation period of interest 142. That information, in turn, will then be subjected to application of compensation rules dealing with sales hierarchy 144 with respect to the relevant trades and asset positions. The compensation rules are then applied in order to match the criteria given in one or more rule sets 146 to the trades and asset positions in question, with the output information then being delivered to the compensation rules engine 150, wherein a determination of compensation will be made based upon the compensation rules 22 as applied by the compensation rules engine 30 to the investment data 20 emerging from database server 18 (FIG. 1).

Figure 4:
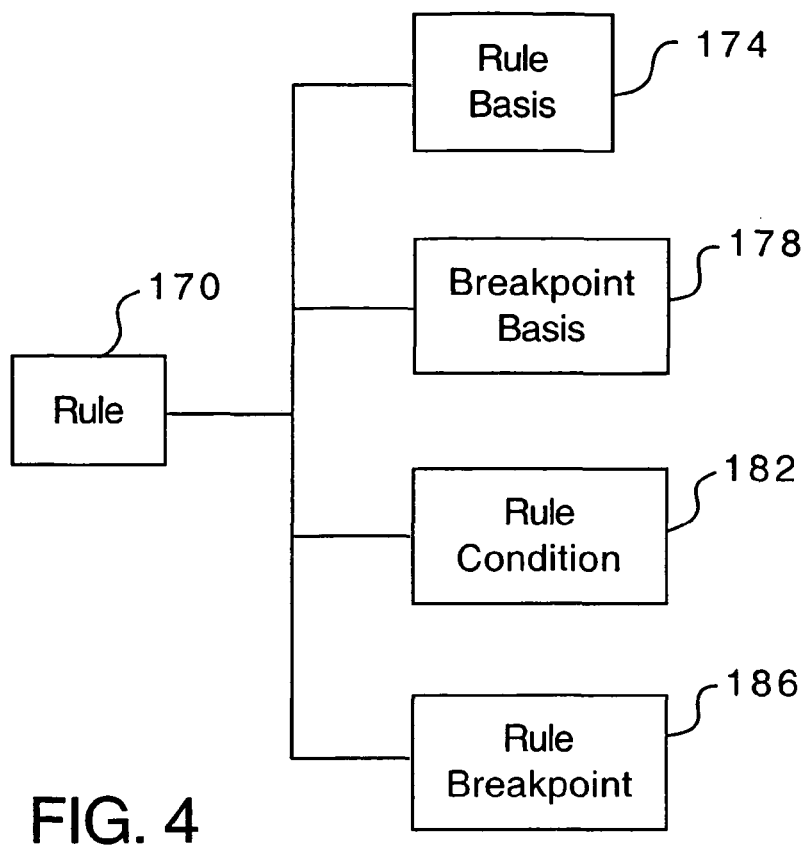
FIG. 4 shows schematically a form of rule employable in the present invention and the components thereof.

Referring to FIG. 4, the components which preferably are included in a compensation rule 170 will be considered. It will be appreciated that with the sales unit embracing a broad range of individuals and legal entities and the nature of the activities as well as basis for determining compensation, all contribute to providing a large variety of variables employed in making such a determination. It is important to have a system which can be customized so as to determine compensation based on the number of variables which through appropriate rules are employed to permit determination of specific compensation for a specific sales unit. For example, the rules basis 174 may be based upon sales measurements, asset measurements or both. In the former category, gross sales or total net sales may be the measuring standard. As to assets, asset growth, average assets during the time period in question, simple average assets and time-weighted average assets may be employed. "Asset growth" relates to the change in asset position for each account and product combination based upon the asset information available. This may be determined by the difference in value of the assets in question between the last day of the compensation period and the first day of the compensation period. The difference between average assets and simple average assets may be a determination of average on a weekly basis with the simple average being determined on a monthly basis. The time-weighted average assets may involve frequent determinations of asset values such as daily with subsequent complication of the average of such values. There also could be a breakpoint basis 178 which would cause the standard for compensation within a particular increment of measured performance to be changed. For example, the breakpoint could involve sales or asset value reaching a certain level measured in dollars, corresponding foreign currency or a sales unit reaching a given percentage of the pre-established goal or age of assets or variations based upon a particular time frame. The foregoing examples are not limiting of the types of variables which can be taken into consideration.

In connection with sales determination, the system disclosed in U.S. patent application Ser. No. 10/944,202 and described in part herein in connection with FIG. 2 may be employed to assign credit for sales to a particular sales unit. The rule conditions 182 may be customized to whatever the user desires and may, for example, involve one or more of the following data objects: account type, contract, discount category, firm need, fund type, investment data, money type, plan, plan type, platform, portfolio name, product family, product name, sales hierarchy, share class and rule breakpoints. The system user may determine which of these factors are applied. Another component which may be used in establishing rules are the rule breakpoints 186. Once again, the user may select which of the factors will be considered in determining what standard is employed for a breakpoint and if it has been reached. The compensation data engine will apply to the rules 170 in making determinations regarding the rule conditions 182 and rule breakpoints 186. The following are examples of items which may be employed as rule breakpoint elements. A high value may be employed by the compensation engine to determine if a category involved in amounts greater than the low value has been achieved. The payout type which may be in monetary terms such as dollars or other currency or in basis points may be employed. The payout value defines what will be paid out once a breakpoint has been reached. The payout guarantee is employed where a sales unit is entitled to a minimum amount if breakpoint level has been reached. The payout cap establishes a maximum amount to be paid regardless of the calculated value for a breakpoint level. The time frame date and time period may also be factors in determining if a breakpoint has been reached. There also may be a default goal which is a value entered if a certain percentage of goal is deemed a breakpoint. In general, one must define at least one rule condition 182 for each rule breakpoint 186.

The system is capable of making a compensation determination for a time period which may or may not be the same as the period for which payment will be made, for example, the compensation determination may be made weekly, but payment made on a monthly basis.

Figure 5:
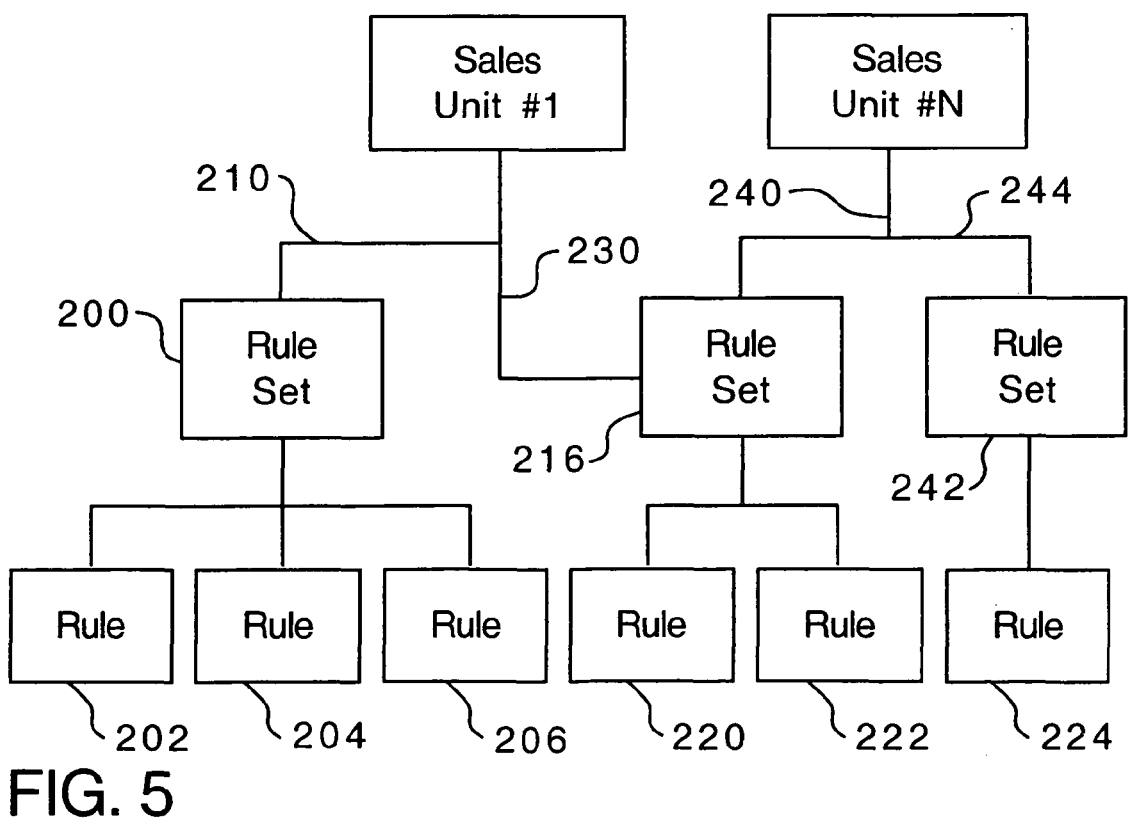
FIG. 5 illustrates rules sets as applied to sales units.

Referring to FIG. 5, the method and system of the present invention permit rules to be grouped in rule sets which apply to a particular sales unit and permit a plurality of rule sets to be applied to a particular sales unit. For example, in the form shown in FIG. 5, a sales unit #1 is connected to a first rules set 200 which is comprised of rules 202, 204, 206 through line 210 and a second rules set 216 which comprises rules 220, 222 through connection 230. This means that sales unit #1 is subject to two rules sets 200, 216, each of which has rules 202, 204, 206; 220, 222, respectively. Sales unit #N is connected to rules set 216 through line 240 and to rules set 242 through line 244 with rules set 244 being connected solely to rule 224. A rule may also be part of more than one rule set such as rule 222 which is part of rule set 216 and rule set 242. If desired, individual rules within a rules set may be employed in a hierarchical sense such that considering first the rule of highest priority in the hierarchy and moving toward descending hierarchical rules, if a rule is satisfied, there is no need to examine subsequent rules which are lower in priority in the hierarchy.

It will be appreciated that the method and system of the present invention may be employed to generate the compensation determinations for output in any desired media such as electronic, on a display screen, through hard copy or by any other desired means. Also, there is flexibility in terms of the format and content desired and the screens that will be employed to select particular parameters.

The compensation determinations may also be employed by the system to generate payment information to the sales units and to maintain desired compensation records.

It will be appreciated that the present method and associated apparatus provide efficient, computerized processing of nonuser externally delivered investment data which contains compensation data which is received, processed and stored in an organized manner in a server or group of cooperating servers with a plurality of external users being able through the internet to obtain access to the information and a data steward being able to review and revise the same. Alternatively, in lieu of internet access, access may be obtained through an internal network. All of this facilitates employing the desired transaction and asset holding information with the complex compensation arrangements to permit rapid accurate determination and reporting of compensation due.

Whereas particular embodiments of the invention have been described herein for purposes of illustration, it will be evident to those skilled in the art that numerous variations of the details may be made without departing from the invention as set forth in the appended claims.

The invention claimed is:

1. A computerized method of processing investment data, comprising:

providing at least one server comprising at least one computer having a computer readable tangible medium having stored thereon program instructions executable by a processor of a computer and supporting a database for receiving, processing and storing the investment data, having information about at least one financial transaction involving at least one investment held or acquired by at least one mutual fund;

providing, to the at least one server, at least one rules set, comprising at least one compensation rule and at least one breakpoint rules, wherein the at least one rules set is employed for compensation determination to obtain a compensation owed by the at least one mutual fund to at least one sales unit, wherein the compensation determination comprising at least:

i) identifying the at least one sales unit, wherein the at least one sales unit is either an individual, partnership, corporation, or other organization, or legal entity, or a combination of any of the foregoing which is entitled to receive a compensation from the at least one mutual fund based at least in part on the at least one sales unit's contribution to the at least one financial transaction involving the at least one investment held or acquired by the at least one mutual fund, and ii) determining the compensation, owed by the at least one mutual fund to the at least one identified sales unit, based at least in part on:

1) the at least one financial transaction;
    2) the at least one sales unit's contribution to the at least one financial transaction, and
    3) the at least one compensation rule;

wherein the at least one breakpoint rule is a pre-determined standard measured in dollars or percentage of a pre-determined target value and is employed to initiate a transition in the compensation determination from at least one first compensation rule to at least one second compensation rule, and wherein the at least one compensation rules is capable of being applied in a hierarchical sequence, such that the application of the at least one compensation rule will avoid the need to apply at least one third compensation rule being a lower priority in the at least one rules set;
introducing the investment data into the server; and
employing a rules engine by the server to apply the at least one rules set to the investment data for performing the compensation determination to obtain the compensation owed by the at least one mutual fund to the at least one identified sales unit.

2. The computerized method of processing investment data of claim 1 including providing the investment data from a plurality of sources to the server by at least one data interface objects.

3. The computerized method of processing investment data of claim 2 including receiving the investment data from a plurality of external sources through a plurality of data interface objects simultaneously.

4. The computerized method of processing investment data claim 1 including storing in the server the investment data, comprising information relating to trade information.

5. The computerized method of processing investment data claim 1 including storing in the server the investment data, comprising information regarding investment asset positions.

6. The computerized method of processing investment data of claim 1 including the server stored the investment data including data selected from the group consisting of sales unit customer transactions of the at least one identified and sales unit customer asset holdings of the at least one identified sales unit.

7. The computerized method of processing investment data of claim 1 including periodically effecting at least one changes in the at least one rules set.

8. The computerized method of processing investment data of claim 7 including the rules engine being structured to permit review, prototyping and simulation of at least one results of the at least one change in the at least one rules set.

9. The computerized method of processing investment data of claim 1 including effecting determination of the compensation employing at least one parameter selected from the group consisting of: gross sales, net sales, asset growth, and average assets.

10. The computerized method of processing investment data of claim 1 including creating an audit trail to resist at least one unauthorized changes to the at least one rules set and facilitate tracking the at least one unauthorized change by user identity.

11. The computerized method of processing investment data of claim 1 including reflecting the compensation determination based upon a specific time period.

12. The computerized method of processing investment data to determine compensation for a sales unit of claim 1 including establishing the at least one breakpoint rule as performance-related item.

13. The computerized method of processing investment data of claim 12 including the at least one breakpoint rule being established by consideration of at least one of the following factors: absolute dollar amounts, percentage achievement of goals and age of assets.

14. The computerized method of processing investment data of claim 13 including the at least one breakpoints rule having information regarding minimum compensation guarantees and maximum compensation.

15. The computerized method of processing investment data of claim 1, wherein the compensation determination comprising any guarantee to which the identified at least one sales unit is entitled to in effecting the compensation determination.

16. The computerized method of processing investment data of claim 1 including periodically revising the at least one breakpoint rule for the at least one sales unit.

17. The computerized method of processing investment data of claim 1 including in obtaining the compensation determination, separating the compensation based upon trades from the compensation based upon asset positions.

18. The computerized method of processing investment data of claim 1 including permitting a user to retrieve information on the basis of at least one field selected from the group of types consisting of: sales unit, compensation rule, rules set, rules hierarchy, breakpoint rule, time period, payment made to sales unit, geographic location of sales unit, guarantee, asset value transaction and specific investment.

19. The computerized method of processing investment data of claim 1 including in effecting the compensation determination, limiting the compensation determination to a specific predetermined compensation period.

20. The computerized method of processing investment data of claim 17 including employing at least one hierarchical rules set to determine the trade or asset positions to which the at least one identified sales unit has been assigned for compensation purposes.

21. The computerized method of processing investment data of claim 1 including employing multiple rule breakpoints in the at least one rules set rule.

22. The computerized method of processing investment data of claim 1 including employing in the compensation determination at least one item from the group consisting of gross sales, total net sales, asset growth measured by average assets, simple average assets and time-weighted average assets.

23. The computerized method of processing investment data of claim 21 including employing at least one breakpoint rule having at least one measure selected from the group consisting of: monetary volume of sales, percentage of sales unit goal achieved and time frame.

24. A computer system for processing investment data, comprising:
at least one server comprising at least one computer having a computer readable tangible medium having stored thereon program instructions executable by a processor of a computer and supporting a database for receiving, processing and storing the investment data, having information about at least one financial transaction involving at least one investment held or acquired by at least one mutual fund;
wherein the program instructions comprising:
code to receive the investment data;
code to employ a rules engine by the at least one server to apply at least one rules set to the received investment data to perform compensation determination to obtain a compensation owed by the at least one mutual fund to at least one sales unit,
wherein the at least one rules set comprising at least one compensation rule and at least one breakpoint rule,
wherein the compensation determination comprising at least:
i) identifying the at least one sales unit, wherein the at least one sales unit is either an individual, partnership, corporation, or other organization, or legal entity, or a combination of any of the foregoing which is entitled to receive a compensation from the at least one mutual fund based at least in part on the at least one sales unit's contribution to the at least one financial transaction involving the at least one investment held or acquired by the at least one mutual fund, and ii) determining the compensation, owed by the at least one mutual fund to the at least one identified sales unit, based at least in part on:
1) the at least one financial transaction;
2) the at least one sales unit's contribution to the at least one financial transaction, and
3) the at least one compensation rule, wherein the at least one breakpoint rule is a standard measured in dollars or percentage of a pre-determined target value and is employed to initiate a transition in the compensation determination from at least one first compensation rule to at least one second compensation rule, and wherein the at least one compensation rule is capable of being applied in a hierarchical sequence, such that the application of the at least one compensation rule will avoid the need to apply at least one third compensation rule being a lower priority in the at least one rules set.

* * * * *

UNITED STATES PATENT AND TRADEMARK OFFICE
CERTIFICATE OF CORRECTION

| | | |
|---|---|---|
| PATENT NO. | : 8,103,564 B2 | Page 1 of 1 |
| APPLICATION NO. | : 11/027084 | |
| DATED | : January 24, 2012 | |
| INVENTOR(S) | : Brian Edward Foote | |

It is certified that error appears in the above-identified patent and that said Letters Patent is hereby corrected as shown below:

Col. 8, Ln. 36, Claim 1, Delete "rules" after the phrase "one breakpoint" and Insert --rule--.

Col. 8, Ln. 65, Claim 1, Delete "rules" after the phrase "at least one compensation" and Insert --rule--.

Col. 10, Ln. 36, Claim 23, Insert --the-- after the phrase "data of claim 21 including employing".

Signed and Sealed this
Twenty-fifth Day of September, 2012

David J. Kappos
*Director of the United States Patent and Trademark Office*